United States Patent
Takeda et al.

(10) Patent No.: US 7,059,847 B2
(45) Date of Patent: Jun. 13, 2006

(54) RESIN MOLDING MACHINE

(75) Inventors: Takeshi Takeda, Omihachiman (JP); Shigeki Takahashi, Omihachiman (JP); Kunihito Seta, Moriyama (JP); Nihei Kaishita, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/485,754

(22) PCT Filed: Jul. 15, 2003

(86) PCT No.: PCT/JP03/08952
§ 371 (c)(1),
(2), (4) Date: Feb. 3, 2004

(87) PCT Pub. No.: WO2004/009324
PCT Pub. Date: Jan. 29, 2004

(65) Prior Publication Data
US 2004/0191356 A1 Sep. 30, 2004

(30) Foreign Application Priority Data
Jul. 24, 2002 (JP) .............................. 2002-214881
Jun. 16, 2003 (JP) .............................. 2003-170204

(51) Int. Cl.
B29C 45/32 (2006.01)
(52) U.S. Cl. ...................................... 425/572; 425/588
(58) Field of Classification Search ................ 425/572, 425/556
See application file for complete search history.

(56) References Cited

U.S. PATENT DOCUMENTS 4,620,958 A * 11/1986 Wiechard ................. 264/328.8
4,752,199 A *  6/1988 Arai .......................... 425/572
5,356,284 A * 10/1994 Sheffield ..................... 425/556
5,599,486 A *  2/1997 Fujishiro et al. ............. 425/556

FOREIGN PATENT DOCUMENTS

JP       49-9858       1/1974
JP       61-295017     12/1986
JP       2002-079548   3/2002

OTHER PUBLICATIONS

Official Communication issued in the corresponding Chinese Application No. 03800927.7 dated Dec. 23, 2006. (With full English translation).

* cited by examiner

*Primary Examiner*—Tim Heitbrink
(74) *Attorney, Agent, or Firm*—Keating & Bennett, LLP

(57) ABSTRACT

To provide a resin molding machine that can reduce cost by eliminating the need for a residual-material remover, and can reduce cycle time and the amount of residual material, the resin molding machine includes a stationary cavity plate that has a gate communicating with a cavity, a sprue bushing in which a sprue is formed for feeding a molding material through the gate into the cavity, a runner plate disposed between the stationary cavity plate 13 and the sprue bushing, a cylinder unit (runner-plate driving mechanism) for rectilinearly reciprocating the runner plate between ejecting positions and via a molding position, the ejecting positions being separated from the molding position A and provided for ejecting the residual material, and an ejecting channel (residual-material ejecting mechanism) for ejecting the residual material at the ejecting positions.

11 Claims, 14 Drawing Sheets

MOLD OPENED

MOLD CLOSED

RESIN INJECTED

MOLD OPENED

RUNNER SLIDING

MOLD CLOSED AND RESIN EJECTED

RESIN INJECTED

RESIN MOLDING MACHINE

BACKGROUND OF THE INVENTION

1. Field of the Invention

The present invention relates to a resin molding machine in which a molding material, such as a thermoplastic resin and a thermosetting resin, is fed from a sprue, through a gate, into a cavity for producing a resin molded article, such as an electronic component.

2. Description of the Related Art

This type of resin molding machine generally uses a three-plate pinpoint-gate mold.

In this mold, as shown in FIGS. 11 and 12, a cavity 53 is provided between the upper surface of a stationary lower mold 51 and the lower surface of a movable upper mold 52 moves vertically between open and closed positions of the mold. The upper mold 52 includes a runner 55 and a gate 54 communicating with the cavity 53. A sprue bushing 56a, which vertically moves and includes a sprue communicating with the runner 55, is disposed on the upper surface of the upper mold 52.

To produce a resin molded article using the above-described resin molding machine, a molding material (see the arrow) is fed, with the mold closed, from the sprue 56, through the runner 55, past the gate 54, and into the cavity 53.

Subsequently, the gate 54 is cut by opening the mold, a resin molded article 58 in the cavity 53 is ejected, and residual material 59 remaining in the gate 54, the runner 55, and the sprue 56 is removed.

A known method for removing this residual material 59 is to provide a residual-material remover 60, as shown in FIGS. 13 and 14, separately from the resin molding machine.

In this residual-material remover 60, a main body 61 supports an arm 62 movably in upward and downward directions and forward and backward directions as indicated by the arrow in FIG. 14. A pinching member 63 having a pair of nails 63a is attached to the tip of the arm 62.

The residual material 59 is held by a runner locking pin 57a as the gate 54 is cut by opening the mold.

Subsequently, the arm 62 moves forward to pinch a sprue section 59a of the residual material 59 with the pinching member 63. The arm 62 is then lowered and moved backward, while extracting the residual material 59 from the sprue bushing 56a, to transfer the extracted residual material 59 to a residual-material container.

A residual-material remover provided separately from a resin molding machine, such as that described above, requires a driving mechanism for driving the arm to move horizontally and vertically. This increases costs.

Moreover, to extract the above-described residual material, the arm movement requires switching of the direction from forward and backward movement to upward and downward movement. In addition, the extent to which the mold opens must correspond to the upward and downward distance of the arm movement. This adjustment increases the time for opening the mold, and thus, increases the cycle time.

Moreover, to reliably hold the residual material with the pinching member, for example, the thickness of the sprue section of the residual material must be increased. Such a requirement results in an increased amount of residual material.

SUMMARY OF THE INVENTION

To overcome the problems described above, preferred embodiments of the present invention provide a resin molding machine that reduces costs by eliminating the need for a residual-material remover, and that reduces cycle time and the amount of residual material.

According to a first preferred embodiment of the present invention, a resin molding machine includes a mold having a cavity plate that is movably disposed between open and closed positions of the mold and that includes a gate communicating with a cavity. The mold further includes a sprue bushing in which a sprue is provided for feeding a molding material through the gate into the cavity. The resin molding machine further includes a runner plate having a runner that is provided between the cavity plate and the sprue bushing, a runner-plate driving mechanism for moving the runner plate between a molding position and an ejecting position, the sprue and the gate communicating via the runner at the molding position, the ejecting position being separated from the molding position and provided for ejecting residual material remaining in the runner plate, and a residual-material ejecting mechanism for ejecting the residual material in the runner plate from the ejecting position.

According to a second preferred embodiment of the present invention, at least two runners are provided in the runner plate, one being located at the molding position and the other being located at the ejecting position.

According to a third preferred embodiment of the present invention, in the first or second preferred embodiments of the present invention, the runner plate includes a retainer for retaining the residual material when the mold opens and moves.

According to a fourth preferred embodiment of the present invention, in the third preferred embodiment of the present invention, the runner has a tapered shape and functions as the retainer.

According to a fifth preferred embodiment of the present invention, in the third preferred embodiment of the present invention, the retainer is a retaining groove, a concavity, or a convexity provided in the runner plate.

According to a sixth preferred embodiment of the present invention, in the first preferred embodiment of the present invention, the runner-plate driving mechanism drives the runner plate to rectilinearly move or to rectilinearly reciprocate between the molding position and the ejecting position.

According to a seventh preferred embodiment of the present invention, in the first preferred embodiment of the present invention, the runner-plate driving mechanism drives the runner plate to rotate or to rotate in a reciprocating motion between the molding position and the ejecting position.

According to an eighth preferred embodiment of the present invention, in the first preferred embodiment of the present invention, the residual-material ejecting mechanism ejects the residual material from the runner plate by bringing the cavity plate into contact with the residual material as the mold closes.

According to a ninth preferred embodiment of the present invention, in the first preferred embodiment of the present invention, the residual-material ejecting mechanism ejects the residual material from the runner plate by engaging a stopper arranged at the ejecting position with the residual material.

According to a tenth preferred embodiment of the present invention, in the first preferred embodiment of the present invention, the residual-material ejecting mechanism ejects the residual material from the runner plate by blowing the residual material with high-pressure gas supplied from a high-pressure gas source.

According to an eleventh preferred embodiment of the present invention, in the first preferred embodiment of the present invention, the residual-material ejecting mechanism ejects the residual material from the runner plate by pressing the residual material with a pin driven by an actuator.

According to a twelfth preferred embodiment of the present invention, in the first preferred embodiment of the present invention, the residual-material ejecting mechanism ejects the residual material from the runner plate by pinching the residual material with a residual-material pinching member disposed at the ejecting position.

In the resin molding machine according to the first preferred embodiment of the present invention, the runner plate in which the runner is provided is disposed between the cavity plate and the sprue bushing. The runner plate is movable between the molding position at which the sprue and the gate communicate via the runner, and the ejecting position for ejecting the residual material. The residual material in the runner plate is then ejected from the ejecting positions. This enables the mold to have a function of ejecting the residual material. Thus, a known residual-material remover is unnecessary, and cost reduction is achieved.

According to the present invention, the runner plate is moved in one direction between the molding position and the ejecting position. Therefore, the mechanism of the driving unit is simplified as compared to the known mechanism involving biaxial movement of an arm, the extent to which the mold opens is reduced, and the cycle time can be reduced as a result.

Moreover, according to the present invention, since the residual material is ejected by its movement between the molding position and the ejecting position, requirements on sprue shape, which exist in the case of pinching the residual material for removing it, are eliminated, and the amount of residual material is reduced.

According to the second preferred embodiment of the present invention, when one runner of the runner plate is located at the molding position, the other runner is located at the ejecting position. This enables molding to be continuously performed subsequently to or simultaneously with ejection, which increases productivity and further reduces cycle time.

According to the third preferred embodiment of the present invention, the runner plate includes the retainer for retaining the residual material. For example, in the fourth preferred embodiment of the present invention, the runner plate has a tapered shape. In the fifth preferred embodiment of the present invention, the retaining groove, the concavity, or the convexity is provided in the runner plate. Therefore, the residual material is prevented from passing through to the cavity plate and from dropping from the runner plate during traveling and opening of the mold, and therefore, it is reliably ejected at the ejecting position.

According to the sixth preferred embodiment of the present invention, the runner plate is rectilinearly moved or rectilinearly reciprocated between the molding position and the ejecting position. According to the seventh preferred embodiment of the present invention, the runner plate is rotated in a reciprocating motion. Therefore, the mechanism of the driving unit is simplified as compared to the known mechanism involving biaxial movement of an arm. This further reduces cost, a reduces travel distance of the runner plate, and a further reduces cycle time.

According to the eighth preferred embodiment of the present invention, the residual material is extruded from the runner plate by bringing the cavity plate into contact with the residual material. Since the mold closing motion of the cavity plate is efficiently used for ejecting the residual material, a special unit for ejecting the residual material from the runner plate is unnecessary, and the cost is thus reduced.

According to the ninth preferred embodiment of the present invention, the residual material is ejected from the runner plate by engaging the stopper with the residual material when moved to the ejecting position. The residual material is ejected by a simple mechanism, without using a special driving unit.

According to the tenth preferred embodiment of the present invention, the residual material is ejected by blowing it with high-pressure gas. This enables the residual material to be easily and reliably ejected.

According to the eleventh preferred embodiment of the present invention, the residual material is ejected from the runner plate by pressing it with the pin driven by the actuator. This enables the residual material to be easily and reliably ejected.

According to the twelfth preferred embodiment of the present invention, the residual material is ejected by pinching it with the residual-material pinching member. This enables the residual material to be easily and reliably ejected.

Other features, elements, characteristics, steps and advantages of the present invention will become more apparent from the following detailed description of preferred embodiments with reference to the attached drawings.

DETAILED DESCRIPTION OF PREFERRED EMBODIMENTS

Figure 1:
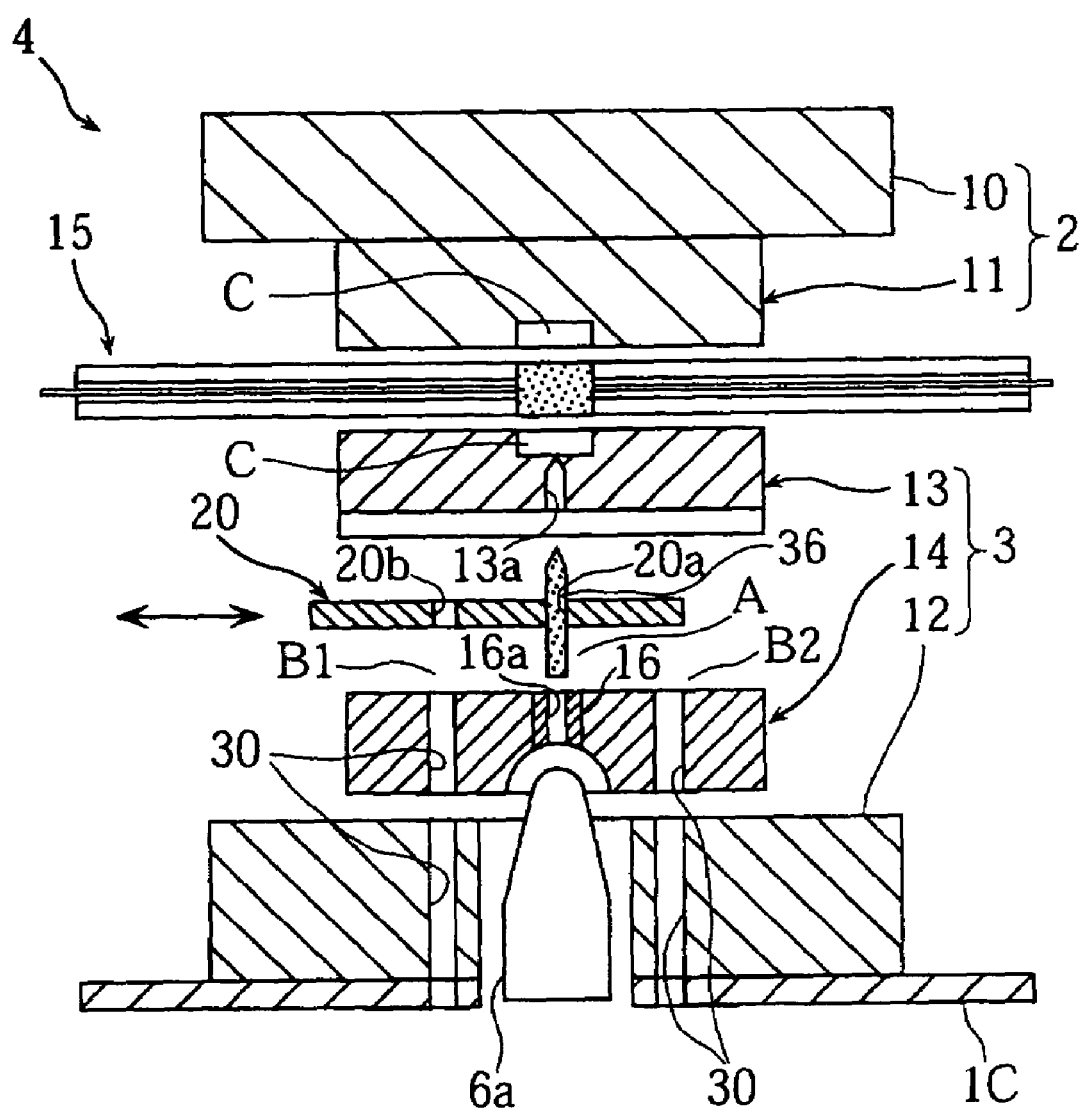
FIG. 1 is a cross-sectional front view showing an open state of a mold in a resin molding machine according to a preferred embodiment of the present invention.
Figure 2:
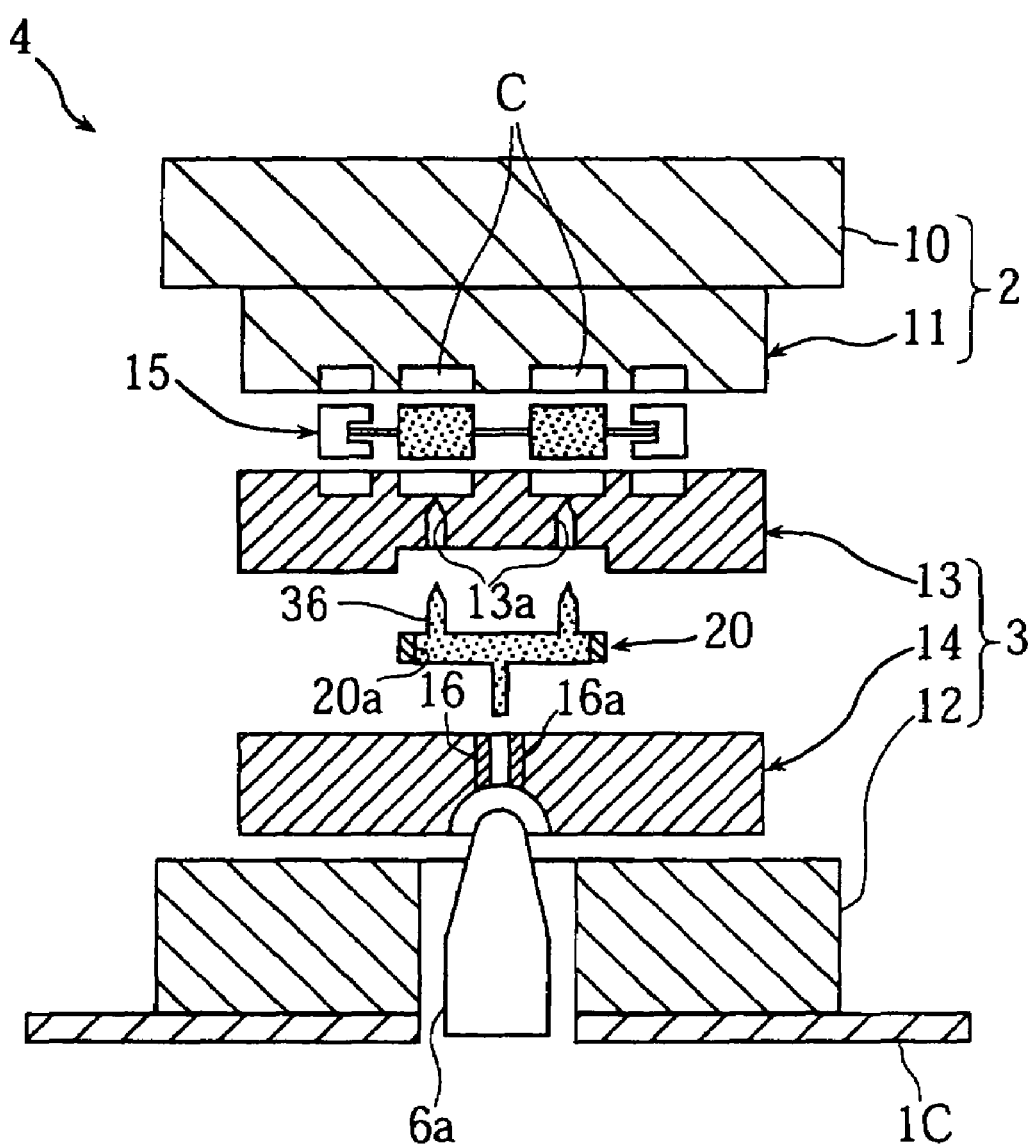
FIG. 2 is a cross-sectional side view showing the open state of the above-described mold.
Figure 3:
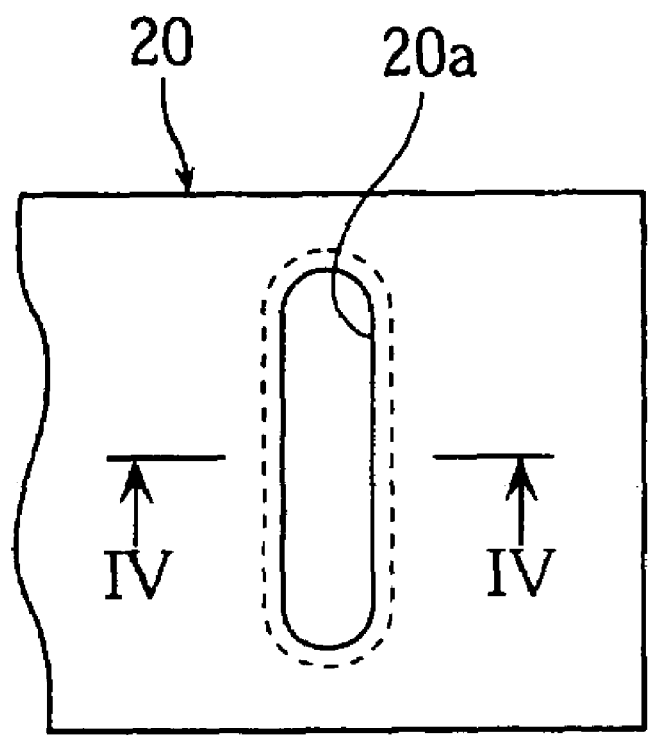
FIG. 3 is a plan view of a runner plate according to the above-described preferred embodiment.
Figure 4:
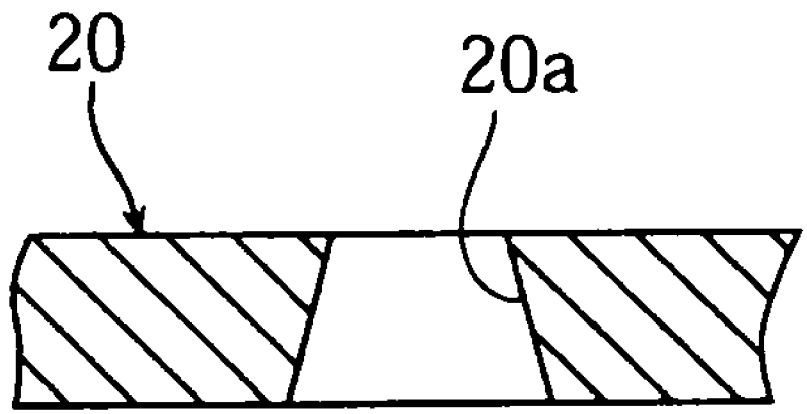
FIG. 4 is a cross-sectional view of the above-described runner plate (section IV—IV of FIG. 3).
Figure 5:
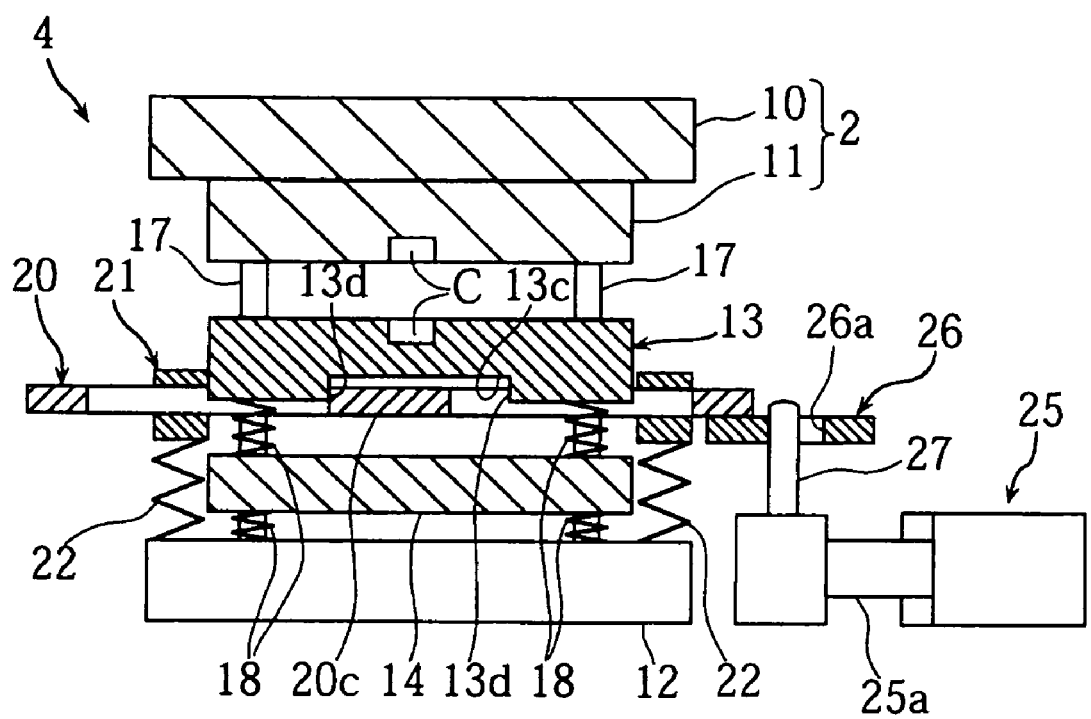
FIG. 5 is a schematic diagram showing a driving unit of the runner plate according to the above-described preferred embodiment.
Figure 6:
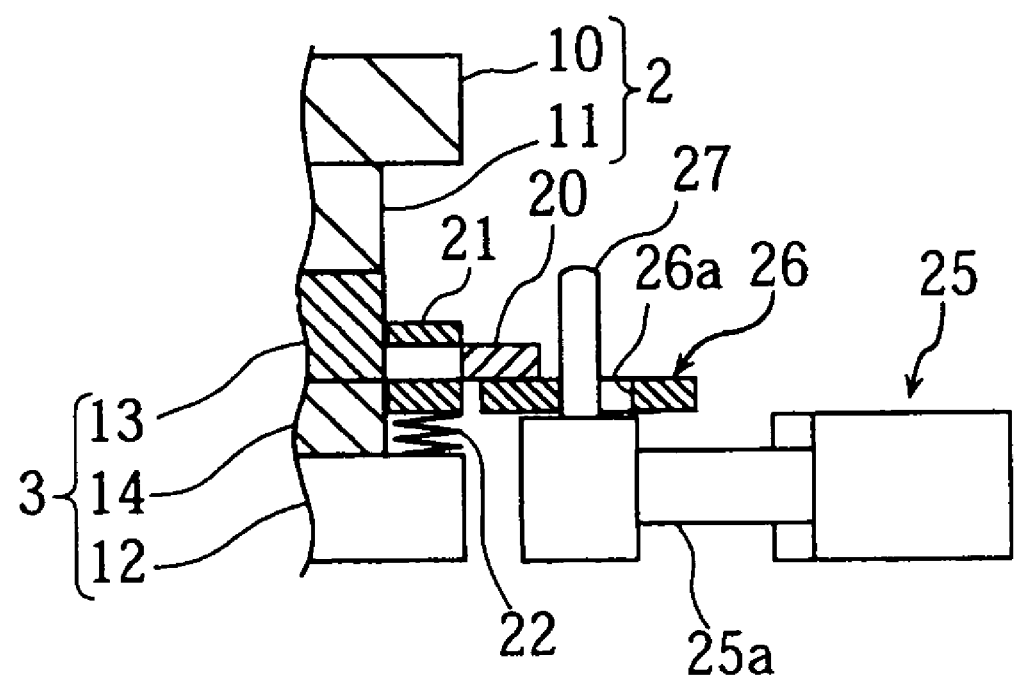
FIG. 6 is a schematic diagram showing a main part of the above-described driving unit of the runner plate.
Figure 7:
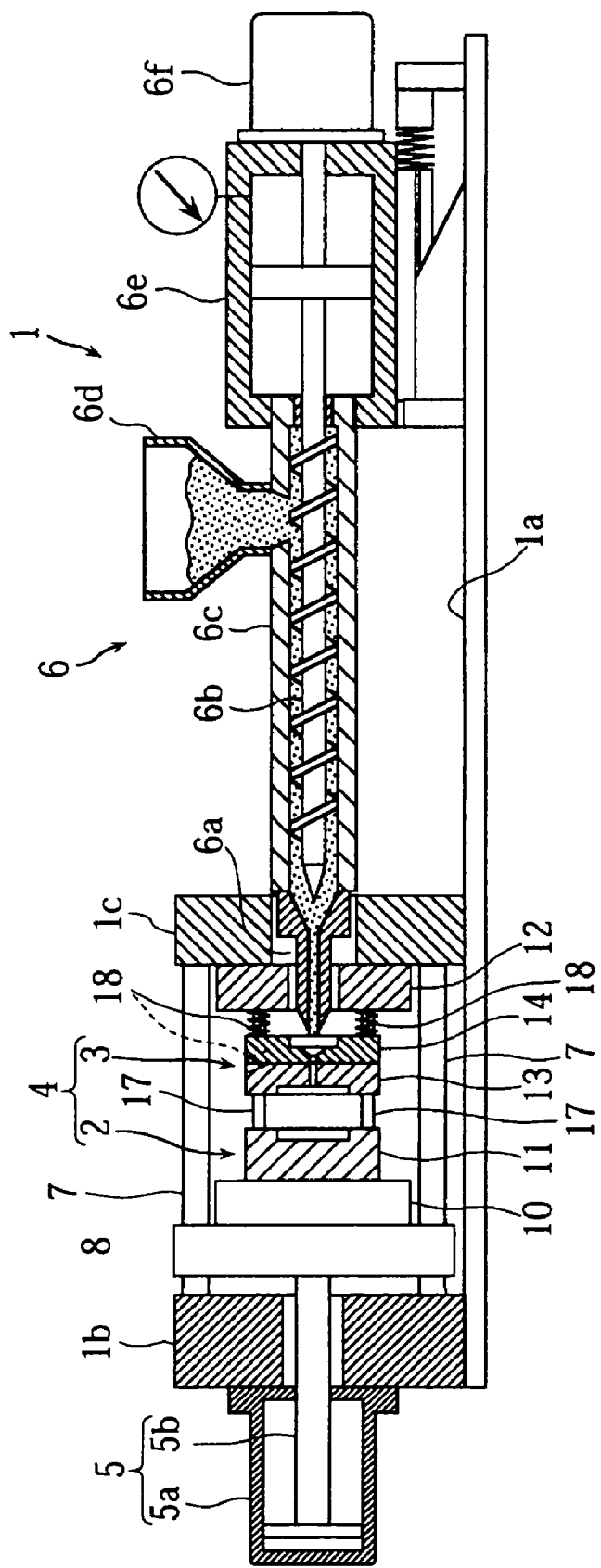
FIG. 7 is a general view showing the overall structure of the above-described resin molding machine.

FIGS. 1 to 9 illustrate a resin molding machine. FIGS. 1 and 2 are a cross-sectional front view and a cross-sectional side view, respectively, both showing a mold in an open state. FIGS. 3 and 4 are a plan view and a cross-sectional view (section IV—IV of FIG. 3), respectively, of a runner plate. FIGS. 5 and 6 are schematic views showing a driving unit of the runner plate. FIG. 7 is an overall view of the resin molding machine. FIGS. 8(a) to (d) and FIGS. 9(e) to (g) show a molding process using the mold.

In these drawings, reference numeral 1 indicates a resin molding machine for injection molding to produce an electronic component made of a thermoplastic resin or a thermosetting resin.

The resin molding machine 1 includes a stationary bed 1a on which a mold 4 that includes a movable mold unit 2 and a stationary mold unit 3, a mold clamping unit 5 that moves the movable mold unit 2 between mold open and closed positions, and a molding-material feeding unit 6 that feeds a molding material into the mold 4 are disposed.

The movable mold unit 2 is fixed to a movable mold platen 8 that is slidably supported by a plurality of guide posts 7.

Each guide post 7 extends between, and is fixed to, a left and right pair of supporting blocks 1b and 1c that are arranged opposite to each other and fixed on the stationary bed 1a.

The mold clamping unit 5 includes a cylinder 5a fixed to the supporting block 1b, and a piston rod 5b disposed in the cylinder 5a and horizontally moved by hydraulic pressure. The piston rod 5b is attached to the movable mold platen 8.

In the molding-material feeding unit 6, a feeding nozzle 6a mounted in the supporting block 1c on the right is connected to a cylinder 6c in which a screw 6b is disposed. The cylinder 6c is connected to a direct-acting actuator 6e and a rotary actuator 6f that actuate the screw 6b. The cylinder 6c is also connected to a hopper 6d for feeding pellets, and a heater, which is not shown, is provided.

The movable mold unit 2 includes a movable cavity plate 11 that is fixed to a movable base plate 10. The movable base plate 10 is fixed to the movable mold platen 8.

The stationary mold unit 3 includes a stationary base plate 12, a stationary cavity plate 13, and a nozzle contact plate 14 interposed therebetween. The stationary base plate 12 is fixed to the supporting block 1c on the left.

The movable cavity plate 11 and the stationary cavity plate 13 define two cavities C. A lead frame guide 15 for ejecting a molded article is disposed between the movable cavity plate 11 and the stationary cavity plate 13.

The stationary cavity plate 13 includes gates 13a and 13a communicating with the cavities C.

The nozzle contact plate 14 includes a sprue bushing 16 containing a sprue 16a that communicates with each gate 13a when the mold is closed.

A plurality of guide shafts 17 support the stationary cavity plate 13 and the nozzle contact plate 14 slidably in the mold opening and closing directions.

Each guide shaft 17 extends between and is fixed to the movable base plate 10 and the stationary base plate 12.

In each guide shaft 17, a spring 18 is provided between the stationary base plate 12 and the nozzle contact plate 14 and between the nozzle contact plate 14 and the stationary cavity plate 13. The springs 18 bias these opposing plates to separate them.

A runner plate 20 is disposed between the stationary cavity plate 13 and the sprue bushing 16.

A slide supporter 21 supports the runner plate 20 slidably in the direction orthogonal to the mold opening and closing directions. Springs 22 are provided between the slide supporter 21, and the stationary base plate 12 and the stationary cavity plate 13 for biasing these plates to separate them.

When the movable cavity plate 11 is released from the mold closed position, the stationary cavity plate 13, which is substantially in contact with the movable cavity plate 11, follows the movable cavity plate 11 by the urging force of the springs 18, while the stationary cavity plate 13, the runner plate 20, and the nozzle contact plate 14 are separated from each other. When the movable cavity plate 11 further moves in the opening direction, it is separated from the stationary cavity plate 13 to complete the mold opening process.

The runner plate 20 includes a first runner 20a and a second runner 20b in the shapes of slotted holes.

The first runner 20a and the second runner 20b have tapered shapes that diverge toward the bottoms (see FIGS. 3 and 4).

A cylinder unit 25 functioning as a runner-plate driver rectilinearly reciprocates the runner plate 20 between an ejecting position B1 on the left and an ejecting position B2 on the right via a molding position A, the ejecting positions B1 and B2 being separated from the molding position A.

That is, when the first runner 20a is located at the molding position A, which allows the sprue 16a to communicate with the gate 13a, the second runner 20b is located at the ejecting position B1 on the left. When the second runner 20b is located at the molding position A, the first runner 20a is located at the ejecting position B2 on the right.

In the cylinder unit 25, a supporting plate 26 having a slotted hole 26a extending in the moving direction is fixed to the runner plate 20. A rod 27 is fitted in the slotted hole 26a of the supporting plate 26, while being connected and fixed to a piston rod 25a.

This enables the runner plate 20 to perform opening and closing movement.

A positioning concavity 13c is provided on the bottom of the stationary cavity plate 13. A stopper 20c provided in the runner plate 20 is located inside the positioning concavity 13c.

The stopper 20c is brought into contact with reference surfaces 13d and 13d on the left and right of the positioning concavity 13c for positioning the runner plate 20 at the molding position A or the ejecting positions B.

Figure 10:
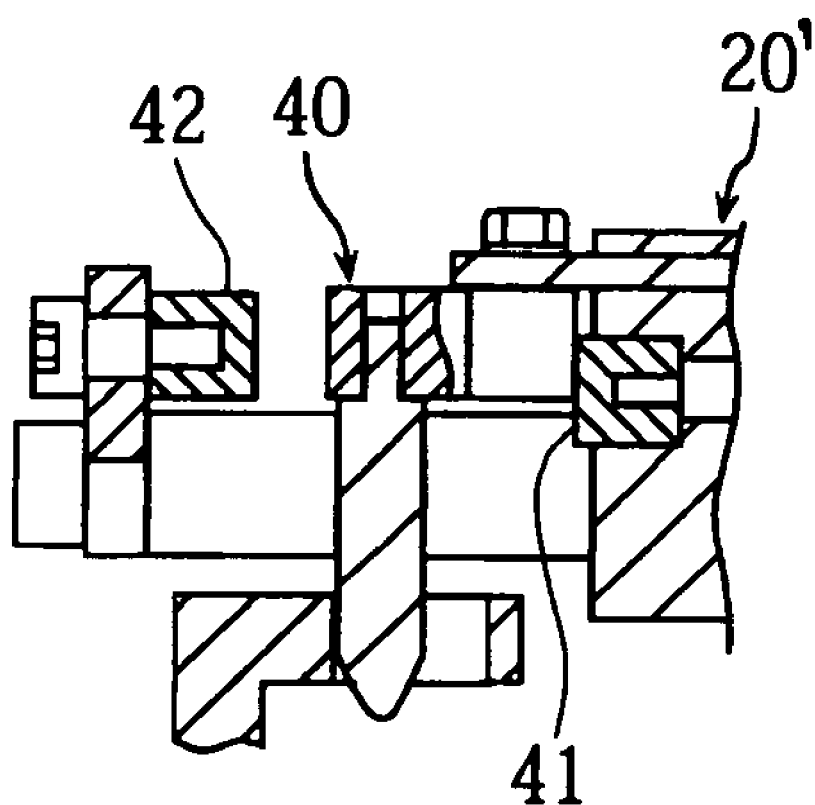
FIG. 10 is a cross-sectional view showing a modification of the driving unit of the runner plate according to the above-described preferred embodiment.
Figure 11:
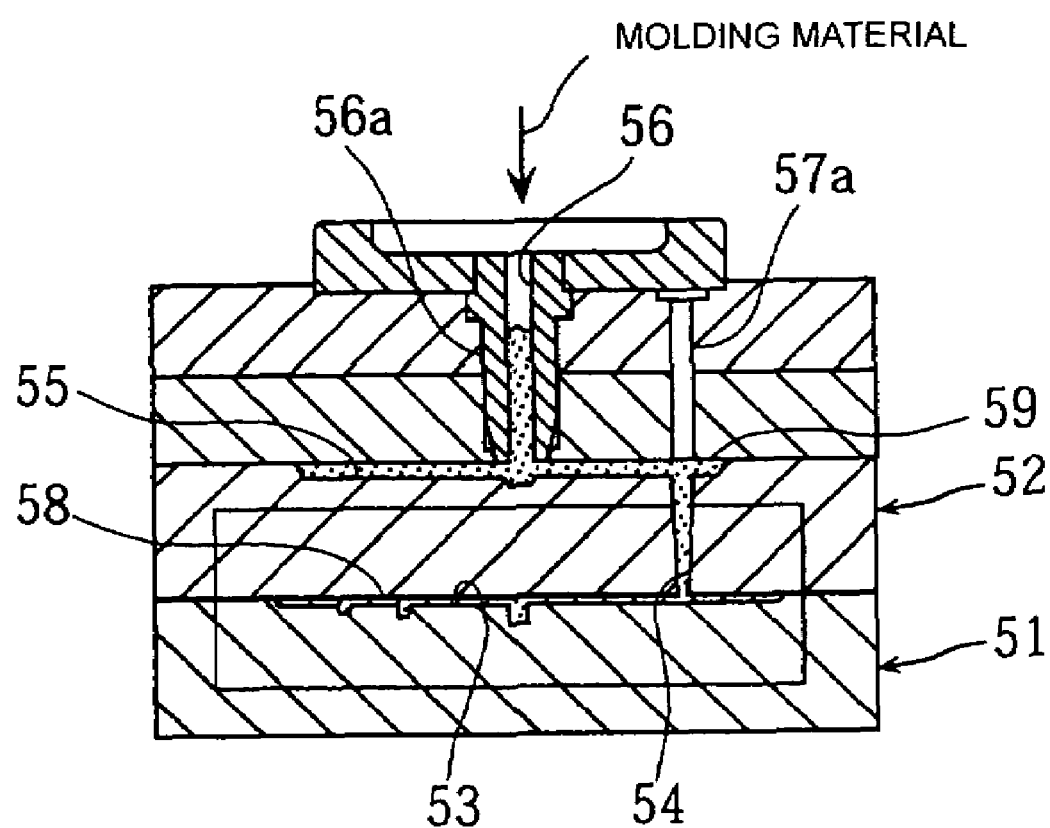
FIG. 11 is a cross-sectional view showing a closed state of a known mold.
Figure 12:
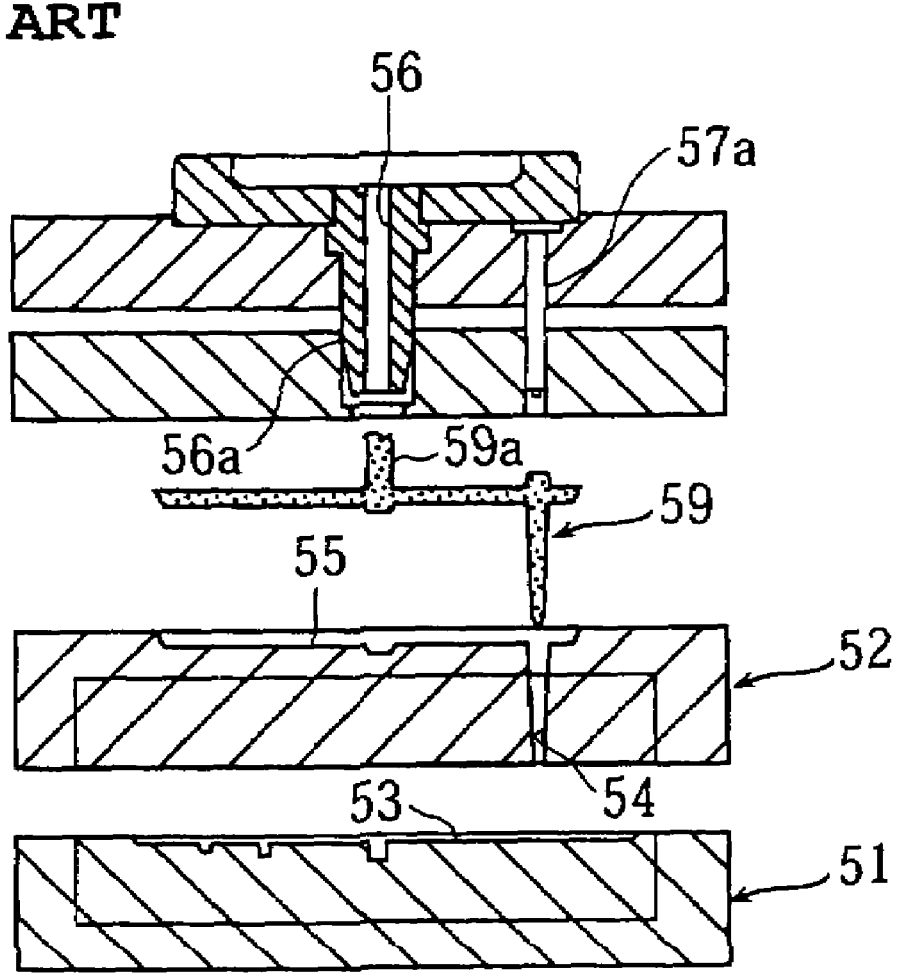
FIG. 12 is a cross-sectional view showing an open state of a known mold.
Figure 13:
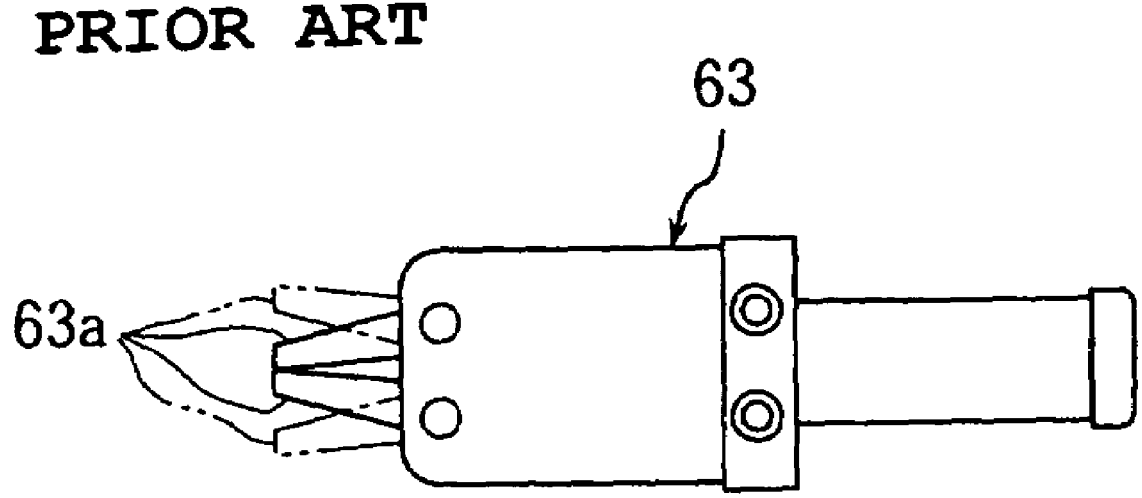
FIG. 13 shows a pinching unit of a known residual-material remover.
Figure 14:
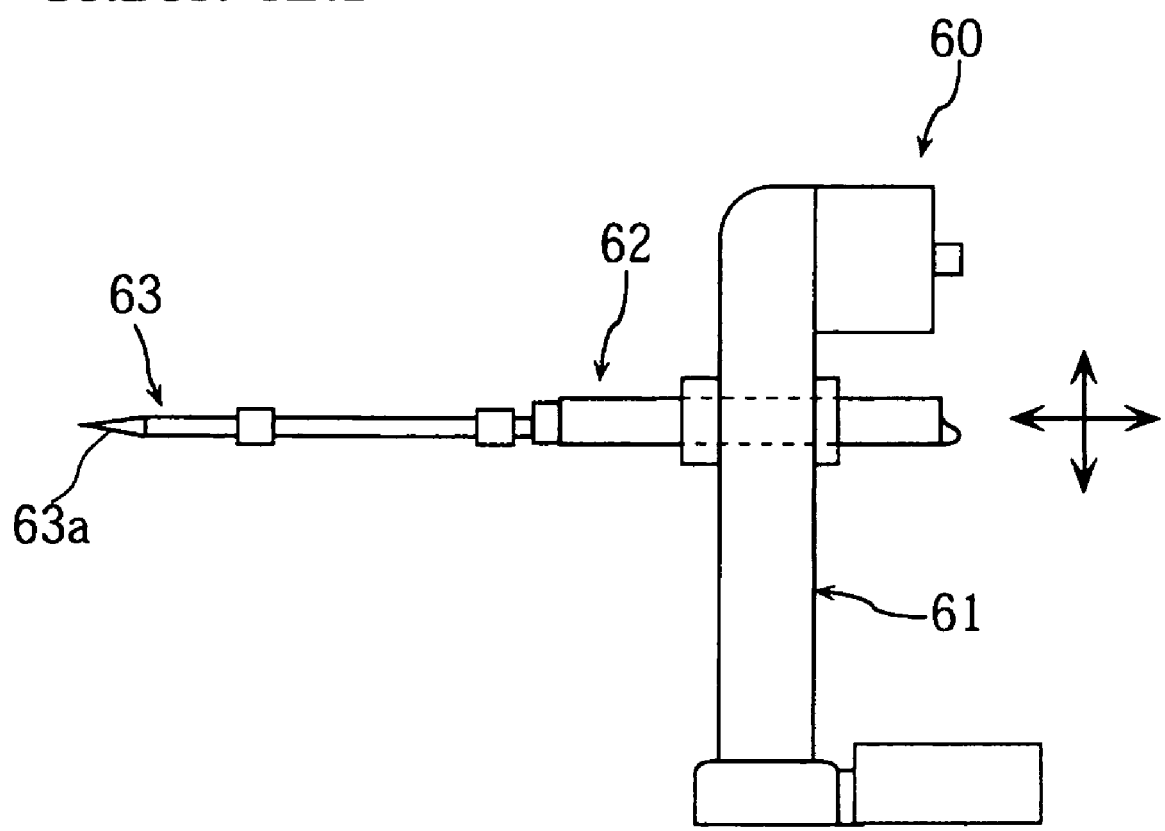
FIG. 14 shows a known residual-material remover.

Referring to FIG. 10, a magnet-attracting block 40 is fixed to a runner plate 20'. Positioning may also be achieved by attaching this magnet-attracting block 40 to a magnet 41 or a magnet 42 disposed at a molding position and an ejecting position, respectively.

Each of the nozzle contact plate 14 and the stationary base plate 12 includes an ejecting channel 30 corresponding to the ejecting positions B1 and B2 for ejecting residual material. The ejecting channels 30 communicate with the exterior of the stationary mold unit 3.

When the stationary cavity plate 13 is lowered along with a mold closing movement, the bottom of the stationary cavity plate 13 comes into contact with the residual material. Then the stationary cavity plate 13 is further lowered to complete the mold closing, extrudes the residual material in the runner plate 20, and allows the residual material to drop into the ejecting channels 30.

A molding process with the resin molding machine will now be described with reference to FIGS. 8 and 9.

Figure 8A:
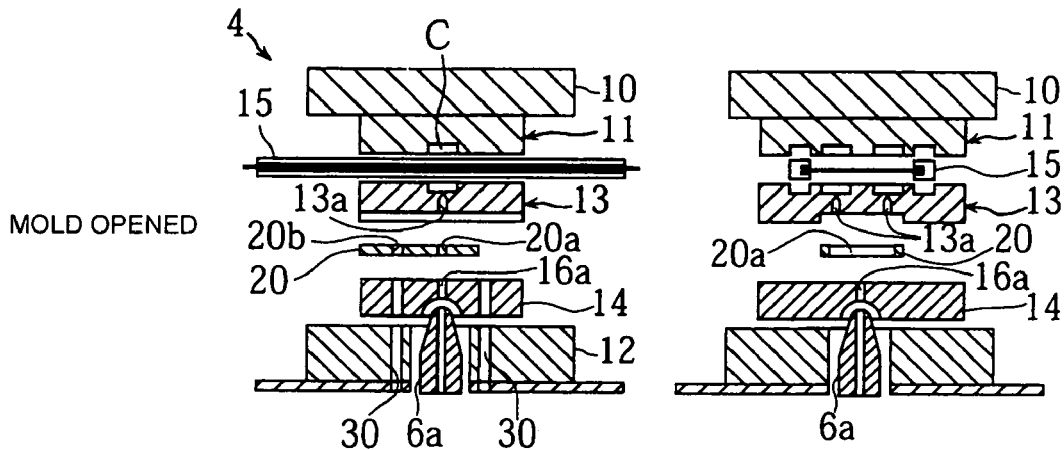
FIGS. 8A–8D are a series of diagrams showing a process of molding with the above-described resin molding machine.
Figure 8B:
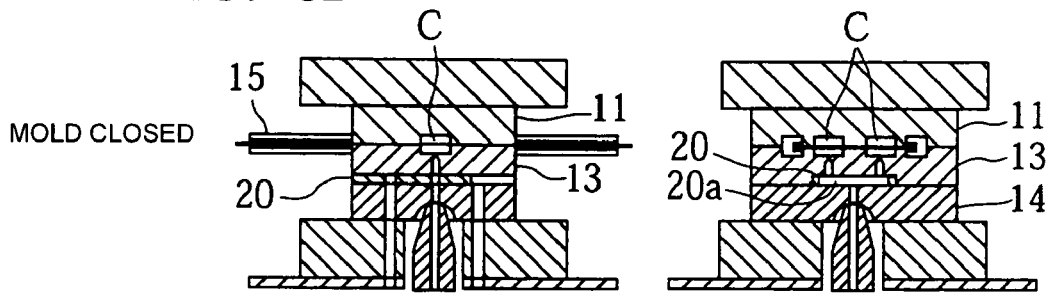

The movable cavity plate 11, when moving from the mold opening position in the mold closing direction, touches and pushes the stationary cavity plate 13, and compresses the springs 18 and 22 to close the mold (see FIGS. 8(a) and (b)).

A heated and melted molding material is injected into the nozzle 6a, passes through the sprue 16a, the first runner 20a, the gate 13a, and is fed into the cavities C.

Figure 8C:
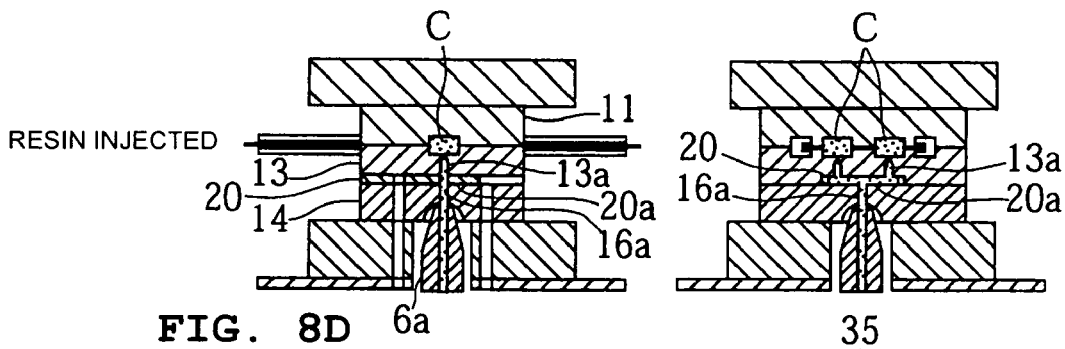
Figure 8D:
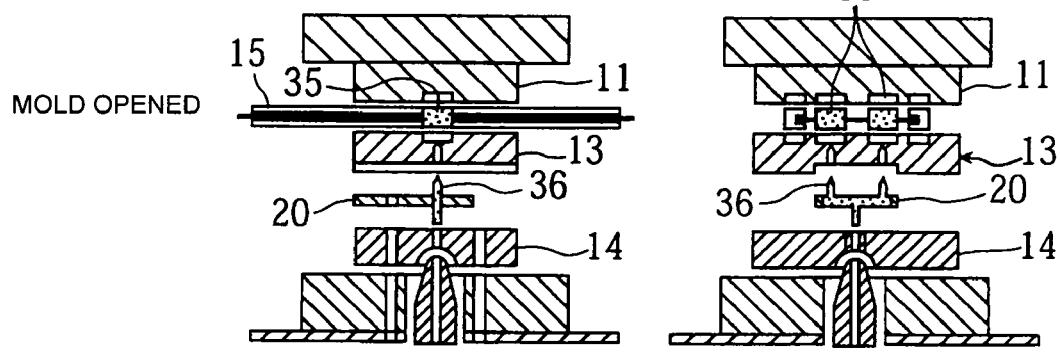

This state is maintained for a predetermined period of time required for solidifying the molding material (see FIG. 8(c)).

In the next step, the movable cavity plate 11 moves in the opening direction.

At the initial stage of the mold opening, the stationary cavity plate 13 and the lead frame guide 15, which are substantially in contact with each other, follow the movable cavity plate 11. Distances between the stationary cavity plate 13 and the runner plate 20, between the runner plate 20 and the nozzle contact plate 14, and between the nozzle contact plate 14 and the stationary base plate 12 increase.

This opening movement separates a molded article 35 from the gate 13a. Residual material 36 remaining in the gate 13a, the first runner 20a, and the sprue 16a is retained in the runner plate 20.

The residual material 36 is retained in the runner plate 20 by balance between the retention of a tapered part of the first runner 20a and the retention of a tapered part of the sprue bushing 16. The mold opening process is thus completed in this state (see FIG. 8(d)).

The cylinder unit 25 drives the runner plate 20 to slide rectilinearly to the right in the drawing. The residual material 36 is then moved to the ejecting position B2 while the second runner 20b is moved to the molding position A.

Figure 9E:
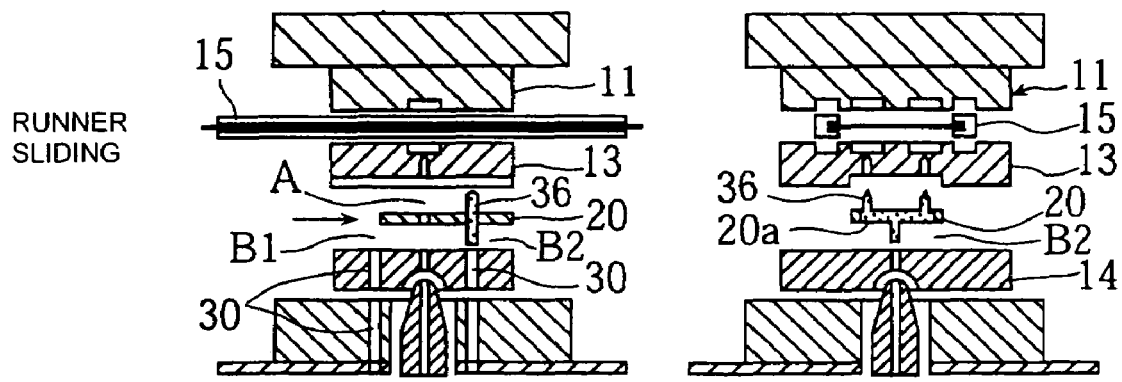
FIGS. 9E–9G are a series of diagrams showing a process of molding with the above-described resin molding machine.

Virtually simultaneously, the lead frame guide 15 moves to a molded-article ejecting position (not shown) for ejecting the molded article 35 at this position (see FIG. 9(e)).

The movable cavity plate 11 then moves in the mold closing direction again, touches and pushes the stationary cavity plate 13, and compresses the springs 18 and 22.

Figure 9F:
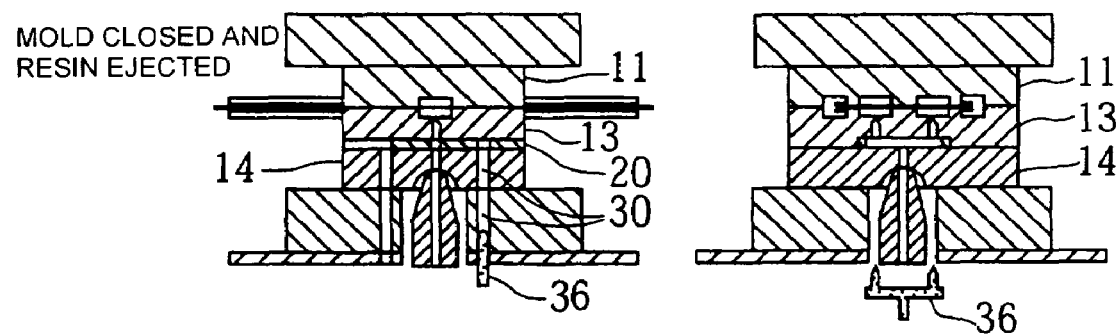

As the stationary cavity plate 13 moves, the residual material 36 is extruded from the runner plate 20, dropped into the ejecting channel 30, and is ejected to the exterior to complete the mold closing process (see FIG. 9(f)).

Figure 9G:
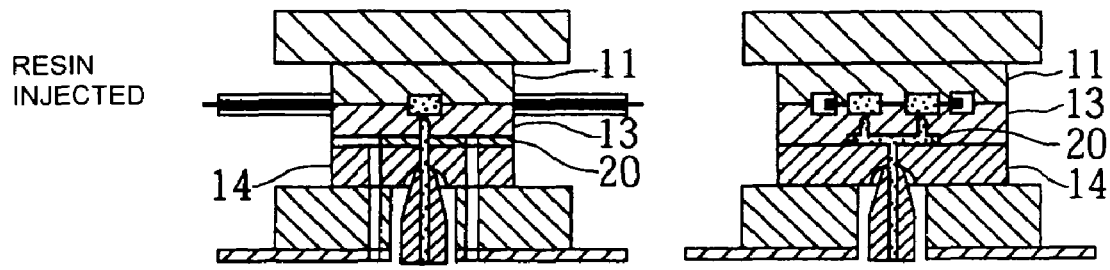

A molding material is then injected into the feeding nozzle 6a, passes through the sprue 16a, the second runner 20b, the gate 13a, and is fed into the cavities C (see FIG. 9(g)).

Molded articles are thus automatically and sequentially produced by repetition of the mold opening and closing operation as described above.

In the resin molding machine of the present preferred embodiment, the runner plate 20 is disposed between the stationary cavity plate 13 and the sprue bushing 16. The runner plate 20 is movable, via the molding position A, between the ejecting positions B1 and B2 that are provided on the left and right of the molding position A, respectively, and the residual material in the runner plate 20 is ejected from the ejecting positions B1 and B2 to the exterior. This enables the stationary mold unit 3 to have a function of ejecting the residual material. Thus, a known residual-material remover is unnecessary, and equipment costs are thus reduced.

In this preferred embodiment, the cylinder unit 25 rectilinearly reciprocates the runner plate 20 between the ejecting positions B via the molding position A. Therefore, the mechanism of the driving unit is simplified as compared to the known mechanism involving biaxial movement of an arm, the extent to which the mold opens is reduced, and the cycle time is reduced as a result.

Moreover, since the residual material is ejected by its rectilinear movement between the ejecting positions B via the molding position A, requirements on sprue shape, which exist in the case of pinching the residual material for removing it, are eliminated, and the amount of residual material is reduced.

In this preferred embodiment, when the first runner 20a of the runner plate 20 is located at the molding position A, the second runner 20b is located at the ejecting position B1. When the second runner 20b is located at the molding position A, the first runner 20a is located at the ejecting position B2. This enables ejection and molding to be performed simultaneously and continuously, increases productivity, and further reduces cycle time.

Since the first runner 20a and the second runner 20b of the runner plate 20 have tapered shapes, the residual material 36 is prevented from passing through to the stationary cavity plate 13 and from dropping from the runner plate 20 during traveling and opening of the mold, and therefore, it is reliably ejected at the ejecting positions B1 and B2.

Instead of forming the above-described tapered shape, a retaining groove, concavity, or convexity may be provided in the runner plate. This is described in the fifth preferred embodiment of the present invention.

This also prevents the residual material from dropping off during traveling and opening of the mold.

In this preferred embodiment, the runner plate 20 is rectilinearly reciprocated between the ejecting positions B1 and B2 via the molding position A. Therefore, the mechanism of the driving unit is simplified as compared to the known mechanism involving biaxial movement of an arm. This reduces cost, reduces travel distance of the runner plate 20, and further reduces cycle time.

The runner plate may be rotated, or it may be rotated in a reciprocating motion between the ejecting positions via the molding position. This is described in the seventh preferred embodiment of the present invention.

Similarly to the above, this also simplifies the driving unit.

In this preferred embodiment, residual material is extruded from the runner plate 20 along with the mold closing motion of the stationary cavity plate 13, and is ejected through the ejecting channel 30 to the exterior of the stationary mold unit 3. Since the mold closing motion of the stationary cavity plate 13 is efficiently used for ejecting the residual material, a special unit for ejecting the residual material is unnecessary, and the cost is reduced.

The present invention is not limited to the above-described preferred embodiment wherein residual material is ejected by the mold closing motion of the stationary cavity plate 13.

For example, a stopper placed at an ejecting position may be engaged with the residual material for ejecting it from the runner plate. This is described in the ninth preferred embodiment of the present invention.

In this case, the residual material is ejected by a simple mechanism, without using a special driving unit.

The residual material may be ejected by blowing it with high-pressure gas supplied from a high-pressure gas source. This is described in the tenth preferred embodiment of the present invention.

The residual material may also be ejected by pressing it with a pin driven by an actuator. This is described in the eleventh preferred embodiment of the present invention.

Moreover, the residual material may also be ejected from the runner plate by pinching it with a residual-material pinching member disposed at an ejecting position. This is described in the twelfth preferred embodiment of the present invention.

The residual material is easily and reliably ejected in any of the above-described cases.

As described above, the resin molding machine of the present invention is useful in producing a resin molded article with a complex shape, and is particularly useful in a production line that requires less cycle time.

The present invention is not limited to the above-described preferred embodiments, but can be modified in the scope of the attached claims. Further, the technologies disclosed in the above-described preferred embodiments can be used in combination, as desired.

The invention claimed is:

1. A resin molding machine comprising:
   a mold having a cavity plate that is disposed movably between open and closed positions of the mold and that includes a gate communicating with a cavity, the mold further including a sprue bushing in which a sprue is provided for feeding a molding material through the gate into the cavity;
   a runner plate having a first runner and a second runner that are provided between the cavity plate and the sprue bushing;
   a runner-plate driving mechanism for moving the runner plate between a molding position and an ejecting position, the sprue and the gate communicating via the runner at the molding position, the ejecting position being separated from the molding position and provided for ejecting residual material remaining in the runner plate; and
   a residual-material ejecting mechanism for ejecting the residual material in the runner plate from the electing position; wherein
   when the first runner is located at the molding position, the second runner is located at the ejecting position, and when the first runner is located at the ejecting position, the second runner is located at the molding position.

2. A resin molding machine according to claim 1, wherein the runner plate includes a retainer for retaining the residual material when the mold opens and moves.

3. A resin molding machine according to claim 2, wherein the runner has a tapered shape and functions as the retainer.

4. A resin molding machine according to claim 2, wherein the retainer is a retaining groove, a concavity, or a convexity provided in the runner plate.

5. A resin molding machine according to claim 1, wherein the runner-plate driving mechanism drives the runner plate to rectilinearly move or to rectilinearly reciprocate between the molding position and the ejecting position.

6. A resin molding machine according to claim 1, wherein the runner-plate driving mechanism drives the runner plate to rotate or to rotate in a reciprocating motion between the molding position and the ejecting position.

7. A resin molding machine according to claim 1, wherein the residual-material ejecting mechanism ejects the residual material from the runner plate by bringing the cavity plate into contact with the residual material as the mold doses.

8. A resin molding machine according to claim 1, wherein the residual-material ejecting mechanism ejects the residual material from the runner plate by engaging a stopper arranged at the ejecting position with the residual material.

9. A resin molding machine according to claim 1, wherein the residual-maternal ejecting mechanism ejects the residual material from the runner plate by blowing the residual material with high-pressure gas supplied from a high-pressure gas source.

10. A resin molding machine according to claim 1, wherein the residual-material ejecting mechanism ejects the residual material from the runner plate by pressing the residual material with a pin driven by an actuator.

11. A resin molding machine according to claim 1, wherein the residual-material ejecting mechanism ejects the residual material from the runner plate by pinching the residual material with a residual-material pinching member disposed at the ejecting position.

* * * * *